350-275
CROSS REFERENCE
SEARCH ROO
88
24
X2682

Sept. 15, 1959 W. BORNEMANN 2,903,941

INDICIA RECORDING DEVICE

Filed May 13, 1955 6 Sheets-Sheet 1

WILLIAM BORNEMANN
INVENTOR.

BY Daniel J. Mayne
Lloyd F. Seebach
ATTORNEY & AGENT

INDICIA RECORDING DEVICE

Filed May 13, 1955

6 Sheets-Sheet 2

WILLIAM BORNEMANN
INVENTOR.

BY Daniel I. Mayne
Lloyd F. Seebach
ATTORNEY & AGENT

WILLIAM BORNEMANN
INVENTOR.
BY Daniel I. Mayne
Lloyd F. Seebach
ATTORNEY & AGENT WILLIAM BORNEMANN
INVENTOR.
BY Daniel D. Mayne
Lloyd F. Seebach
ATTORNEY & AGENT

INDICIA RECORDING DEVICE

WILLIAM BORNEMANN
INVENTOR.

BY Daniel J. Mayne
Lloyd F. Seebach
ATTORNEY & AGENT

Sept. 15, 1959 W. BORNEMANN 2,903,941

INDICIA RECORDING DEVICE

Filed May 13, 1955 6 Sheets-Sheet 6

WILLIAM BORNEMANN
INVENTOR.

BY Daniel D. Mayne
Lloyd F. Seebach
ATTORNEY & AGENT

United States Patent Office 2,903,941

Patented Sept. 15, 1959

2,903,941

INDICIA RECORDING DEVICE

William Bornemann, Rochester, N.Y., assignor to Eastman Kodak Company, Rochester, N.Y., a corporation of New Jersey Application May 13, 1955, Serial No. 508,138

12 Claims. (Cl. 88—24)

The invention relates to a device for presenting a pattern of light which corresponds to a line of indicia on an information bearing medium and which is readily adapted to be used in conjunction with photographic recording apparatus, such as cameras for recording coded information on punched tape, magnetic tape, punched statistical cards and the like.

Various types of devices for presenting information in a photographing station in order to obtain a record thereof are well-known. In such devices the shutters or bars either permit recording of groups of apertures opened by the shutters or characters carried by the bars and arranged in the photographing station and, in both instances, the shutters and bars are usually actuated by linkages associated with a keyboard which is manually operated. The number of exposures made in any given time is, therefore, dependent on the speed of the operator, who also controls the accuracy of the operation.

In the present invention, the operation of the device can be either semi- or fully-automatic and is controlled by the indicia on an information bearing medium, such as a punched tape, a magnetic tape, punched statistical cards, or the like. Reference is made to my copending application Serial No. 508,139 filed May 13, 1955, in which a camera is disclosed for recording a series of indicia or code arranged in lines across a film strip and documents or the like related to the code. This camera utilizes the target device of the invention for presenting successive lines of code in one of the photographing stations of the camera, each line or pattern of code presented to the film strip corresponding to successive lines of code on a punched tape. While the invention is disclosed in conjunction with a camera, it will be apparent from the description thereof that it can be readily adapted to other uses.

The primary object of the invention is, therefore, to provide a device for presenting a pattern of light corresponding to a line of indicia representative of a character and arranged on an information bearing medium.

Another object of the invention is to provide a device for presenting a pattern of light arranged in a line in which the pattern comprises a number of patterns successively presented and corresponding to successive lines of indicia on an information bearing medium.

Still another object of the invention is to provide a device in which a plurality of members normally prevent transmission of light through an elongated aperture, the members being selectively actuated to a non-obstructing position by means associated therewith and responsive to means for sensing indicia positions on an information bearing medium, whereby the actuated members permit a pattern of light to be transmitted through the aperture and which corresponds to the indicia positions on the medium.

Yet another object of the invention is to provide a device in which a plurality of members normally prevent transmission of light through an elongated aperture, the members being selectively actuated in successive groups to a non-obstructing position by means associated therewith and responsive to means for sensing the indicia positions arranged in successive lines on an information bearing medium, whereby the actuated members in each successive group permit a pattern of light to be transmitted through the aperture and the complete pattern corresponds to the indicia positions on a predetermined number of lines of indicia on said medium.

And still another object of the invention is to provide a device in which a plurality of members are moved from an obstructing position with respect to an aperture to a non-obstructing position thereby presenting a pattern of light corresponding to indicia positions on an information bearing element and in which the members in the non-obstructing position are simultaneously reset with respect to said aperture in response to a particular code on said medium, or by means associated with the apparatus used in conjunction with the device.

Other objects and advantages of the invention will be apparent to those skilled in the art by the description thereof which follows.

In the embodiment of the invention disclosed, an aperture in a plate member is aligned with an opening in a casing which houses the entire mechanism aside from the means for sensing the indicia positions on the information bearing medium. Although the information bearing medium can be of a form such as discrete cards or sheets or a tape, the indicia can be placed on either type by magnetic means, by printing, by marking or by punching. The form of the indicia merely determines the type of sensing means to be used, such as brush, photoelectric or pins, any one of which is adaptable to the invention. In the disclosure, a punched tape is utilized and is of the type produced by the tape typewriter which is fully disclosed in U.S. Patent Nos. 2,700,445; 2,700,446; and 2,700,447 issued to E. O. Blodgett.

A plurality of members are pivotally mounted on each side of the apertured plate and each member has an extension or pin which is normally positioned adjacent the plate and with respect to the aperture so that the line of pins prevent transmission of light through the aperture. The members are normally held in this obstructing position by a latch associated with each member and against movement by a spring attached to each member which tends to move its respective member into a position in which the pin no longer blocks the aperture. Release of the latching members is accomplished by a link actuated by a solenoid in response to the sensing means for the indicia. Since the indicia positions in a line are sensed simultaneously, the latching members are also released simultaneously so the pattern corresponding to any line of indicia is presented with the sensing of the line of indicia. The invention is capable of producing a single pattern corresponding to each line, or a single pattern in a line corresponding to a predetermined number of lines of indicia. For example, if a binary code utilizing six indicia positions is used, and a single pattern of light is used, the aperture can be of any size and each pin must then be of a size to cover one-sixth of the aperture. In this case, the number of members correspond to the number of code positions and each member is individual to a code position. However, in order to present a pattern corresponding to a predetermined number of lines, the aperture is extended and the number of members increased. In the camera referred to above, seven lines of indicia or code are presented for exposure across the film. With this arrangement, using a binary, six-position code, forty-two members are arranged so that their respective pins are adjacent the aperture. As each line of code is sensed on the tape, the corresponding members in a group are actuated simultaneously and each group of members is actuated successively. After seven lines have been sensed, a pattern of light is presented across the aperture which corresponds to the seven lines of indicia sensed. At this point the sensing operation is suspended, and the pattern of light is exposed on the light-sensitive material. After exposure, all of the actuated members are simultaneously reset with respect to the aperture and the sensing of seven additional lines is commenced. The resetting operation can be accomplished manually, controlled by the tape or controlled by the camera, this flexibility of control permitting either automatic or semi-automatic operation.

Reference is now made to the accompanying drawings wherein like reference numerals designate like parts and wherein.

Figure 1:
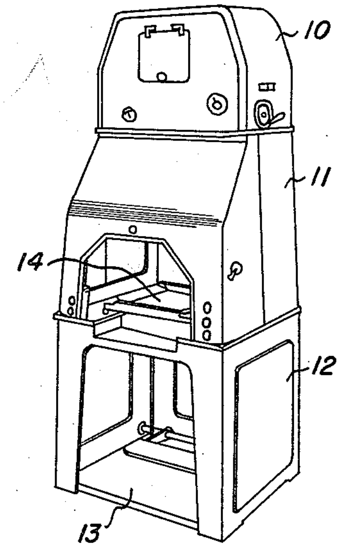
Fig. 1 is a perspective view of a recording device in which the invention is embodied to disclose one adaptation thereof.
Figure 2:
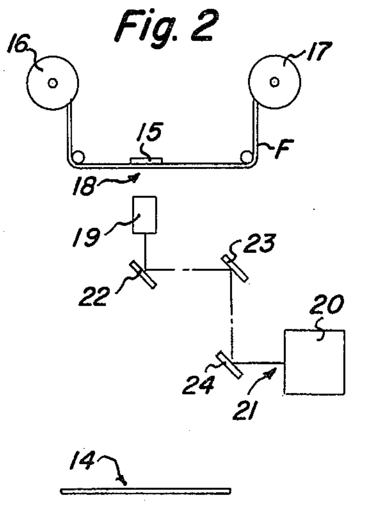
Fig. 2 is a diagrammatic representation of the optical system and film path for the apparatus disclosed in Fig. 1.
Figure 3:
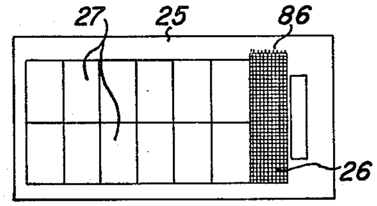
Fig. 3 is a detail view of one of the elements produced by means of the apparatus shown in Figs. 1 and 2.
Figure 7:
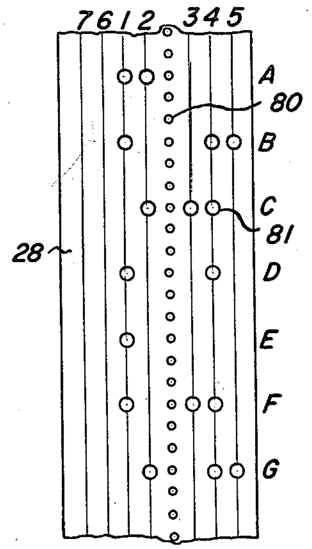
Fig. 7 is a detail view of a portion of a tape having indicia punched therein.

In an adaptation of the invention to apparatus for recording lines of indicia on a light-sensitive material, the apparatus disclosed in Figs. 1 and 2 is fully described in my above-mentioned copending application. However, the general description which follows is deemed to be sufficient in the present instance. The apparatus disclosed in Figs. 1 and 2, comprises a film unit 10 arranged over a copy section 11 which, in turn, is arranged over a base 12 having a knee-hole 13 which permits the operator to sit in a position for placing documents, etc., in the one photographing station 14. Film F is moved by carriage 15 from supply reel 16 to take-up reel 17 and past exposure station 18, the carriage being moved intermittently and in increments corresponding to the requisite reduction factors. Two lenses, only one of which is shown, are provided at 19 and are movable with respect to exposure station 18 for imaging on the light-sensitive material or film F, the material positioned in photographing station 14 or the indicia presented by device 20 positioned as a second photographing station 21 with respect to exposure station 18. The lenses at 19 are moved transversely of the exposure station 18 and the one lens associated with device 20 has mirrors 22 and 23 arranged with respect thereto and for movement therewith, the mirror 24 being fixed with respect to device 20, as described hereinafter. With this arrangement, a series of exposures are made of the material positioned in stations 21 and 14 to provide, after exposure and development in strip form and severing, a series of individual elements 25, as shown in Fig. 3, having a code area 26 and an image area 27, the code being related to the documents and corresponding to a predetermined number of successive lines of code or indicia carried by a tape 28, such as is shown in Fig. 7. As stated hereinbefore, a complete disclosure of the apparatus shown in Figs. 1 and 2 can be found in my above-mentioned copending application.

In the embodiment of device 20, as used in conjunction with recording device 10 and tape 28, seven successive lines of indicia or code which are representative of characters are presented at one time in a single line for exposure across film F. However, device 20 is capable of being made in a form to present a single line corresponding to each line of code as well as any number of successive lines of code or indicia. Device 20 comprises a box-like structure 30 within which is mounted plate 31 having an elongated aperture 32, which is illuminated by lamp 33, and the actuating means 34 for operating the several shutter means 35. Plate 31 provides in effect, the second photographing station for recording apparatus 10. An aperture 36 aligned with aperture 32 is provided in wall 37 of structure 30 and mirror 24 is mounted on wall 37 for directing the image of aperture 32 to mirrors 23 and 22 whereby one of lenses 19 images the aperture 32 on film F. Condenser lens system 38, which is positioned between plate 31 and lamp 33, illuminates aperture 32, the condenser lens system comprising condenser lenses of a length sufficient to cover the length of aperture 32 with light from the single lamp 33.

Figures 4, 5:
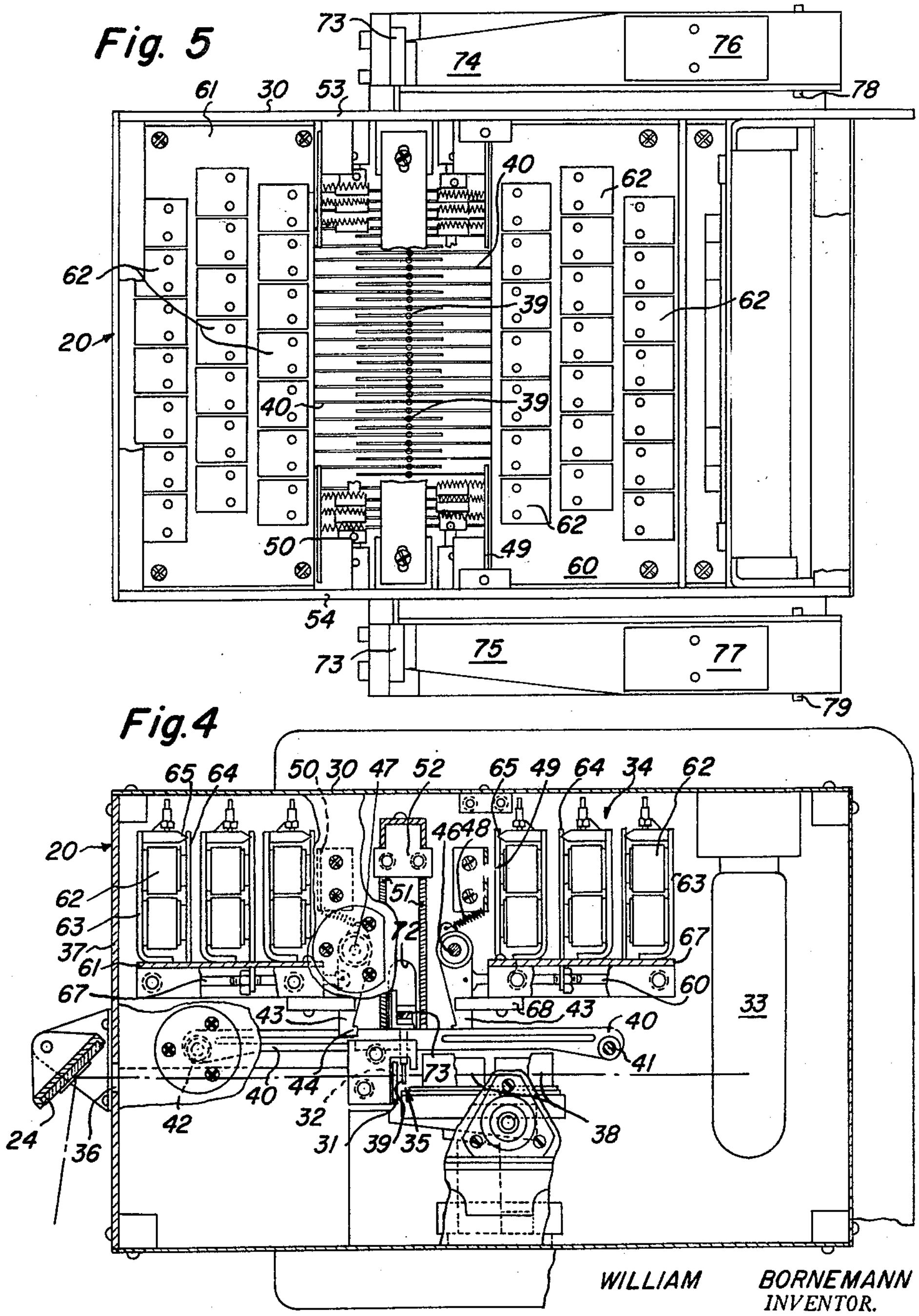
Fig. 4 is a side elevation of the device embodying the invention in which one of the side plates has been removed.
Fig. 5 is a bottom view of the device disclosed in Fig. 4 and showing the arrangement of the actuating means for the plurality of shutter means.
Figures 6, 8:
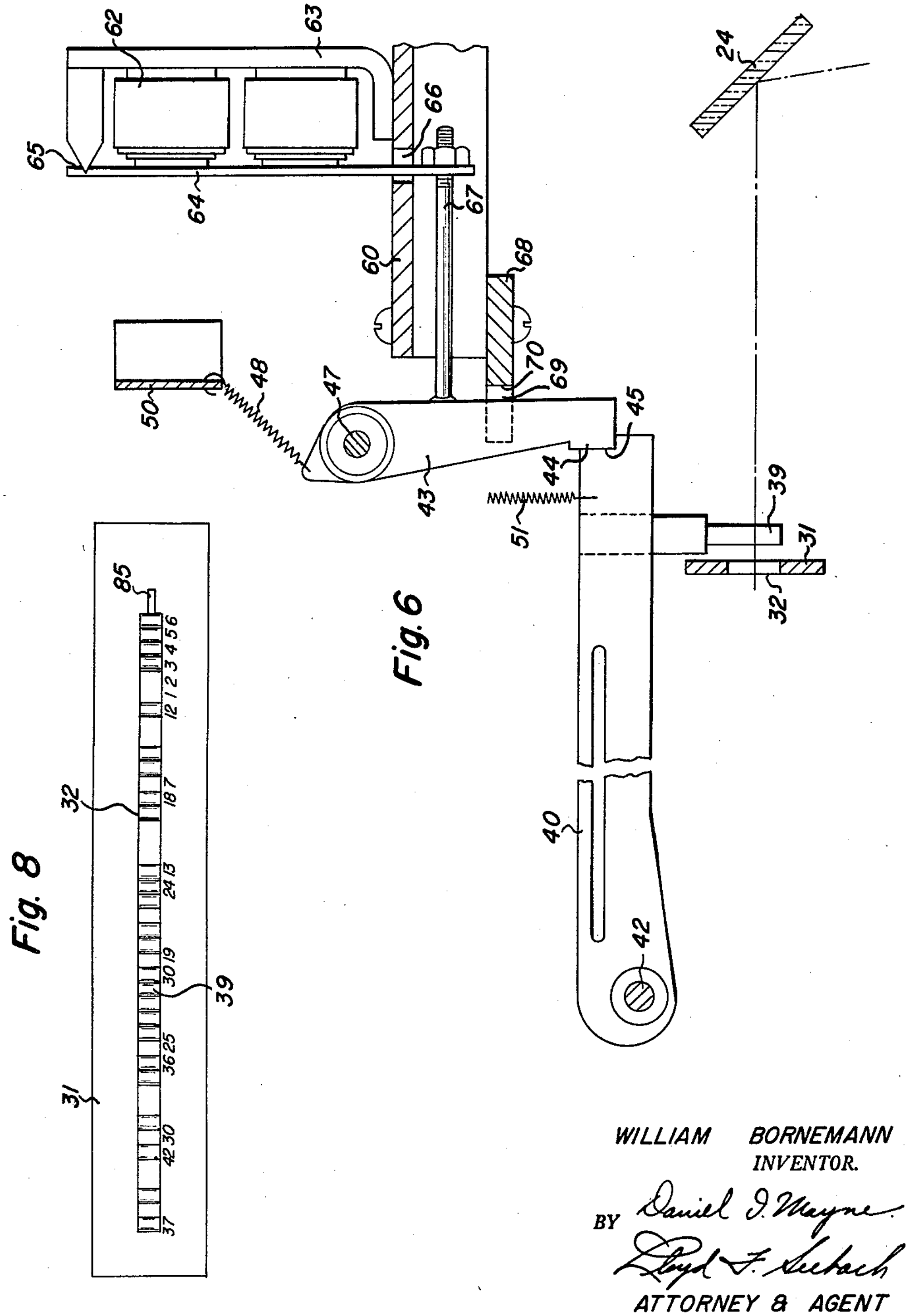
Fig. 6 is a detail side elevation of one of the shutter means and the actuating means therefor.
Fig. 8 is a detail view of the plate showing the appearance of the aperture therein for presenting a line of indicia corresponding to that disclosed on the tape in Fig. 7.

In order to prevent transmission of light through aperture 32, a plurality of members or pins 39 are arranged side by side adjacent aperture 32. Pins 39 extend the length of aperture 32, as shown in Figs. 6 and 8, to normally block the aperture and extend from the arms 40 pivotally mounted on each side of plate 31 on shafts 41 and 42. As shown in Fig. 5, arms 40 are mounted in staggered and spaced relation; that is, every other arm is mounted on the same side of plate 31 which permits pins 39 to substantially contact one another to block aperture 32, the arms being maintained in spaced relation with respect to one another by suitable spacers on shafts 41 and 42. Therefore, arms 40 and their respective pins or extensions 39 can be considered as the shutter means.

For a pattern of light to be exposed on film F, pins 39 must be moved from their normal position in which they prevent transmission of light from lamp 33 through aperture 32 to a position in which portions of aperture 32 are free to transmit light. Pins 39 and arms 40 are maintained in their normal obstructing position by latch members 43, see Fig. 6, a latch member being provided for each arm and having a lip 44 which engages a notch 45 on the end of arm 40. Latch members 43 are mounted in spaced relation along shafts 46 and 47 and are freely mounted thereon. By means of springs 48, which are secured to latch members 43 and the plates 49 and 50 which extend across structure 30, lip 44 of each latch member is maintained in position with respect to notch 45 on its respective arm 40. At the end of each of the arms 40, one end of a spring 51 is secured and the other end thereof is secured to block 52 mounted between walls 53 and 54 of structure 30. Springs 51 serve to move arms 40 about their respective shafts 41 and 42, whereby the respective pins 39 are moved to a position in which light is free to be transmitted through the portion of aperture 32 which would normally be obstructed by pins 39.

On the plates 60 and 61 mounted between walls 53 and 54, a plurality of solenoids 62 are arranged in relation to each of latch members 43. Each of solenoids 62 in mounted on a bracket 63 fixed to plate 60 or 61. Armatures 64 for each solenoid are pivotally mounted at 65 to bracket 63 and extend through an opening 66 in their respective mounting plates 60 and 61. The end of said armatures opposite the pivoted end is fixed to a link 67 each of which is pivotally connected to a latch member 43. Plates 68 are mounted with respect to latch members 43 on both sides of plate 31 and are provided with slots 69 in which latch members 43 are arranged; the inner ends 70 of slots 69 provide a means for limiting the movement of latch members 43 by their respective solenoids 62. Solenoids 62, armatures 64, links 67, latch members 43 and springs 51 provide, therefore, a means for actuating the shutter means to a non-obstructing position with respect to aperture 32.

Walls 53 and 54 are provided with openings 72 through which stop plate 73 extends, plate 73 being fixed at its extremities outside of walls 53 and 54 to the armatures 74 and 75 of solenoids 76 and 77, said armatures being pivotally mounted at 78 and 79. Plate 73 serves as a stop to limit the movement of arms 40 by springs 51 and also serves to reset all of the arms 40 and pins 39 with respect to aperture 32 simultaneously. As described more fully hereinafter, after the pattern of light is completed, solenoids 76 and 77 are energized and armatures 74 and 75 move plate 73 in a direction to reset all of the arms 40 which are in the non-obstructing position.

Tape 28, which is disclosed in Fig. 7, is provided with a longitudinal row of holes or apertures 80 which are utilized for driving or moving the tape through a sensing station. Apertures 81, on each side of apertures 80, are the code holes or indicia and each transverse line thereof is representative of a character. In the present instance a binary two code is used having six transverse positions. It will be noted that seven positions are actually provided on the tape; however, the seventh position is used with code in the other positions to control operation of the tape typewrite and has no relation to the code pattern set up in the device 20. It will be readily understood from the description thus far, that for each sensed line of tape 28, a corresponding number of pins 39 will be moved to a position to permit illumination of its respective portion of aperture 32. In the embodiment just described forty-two arms and an equivalent number of pins represent seven lines of code. The arms and respective pins are, therefore, divided into seven groups of six each, each group being associated with a particular line, the six arms and pins of each group being associated with the six possible code or indicia positions in each line, and each arm and pin being individual to a partcular code position.

In Fig. 8 plate 32 is viewed from the position of mirror 24. It will be noted that aperture 32 is provided at the right-hand end with a slot 85 which is provided with no shutter. This slot provides a timing or reference mark 86 on elements 25 which is exposed on the film along side each line of code. It will be noted that the pattern of each line appears from right to left, which is ultimately reversed by the optical system, and that the code positions number from right to left consecutively and correspond to those appearing on tape 28.

Figure 9A:
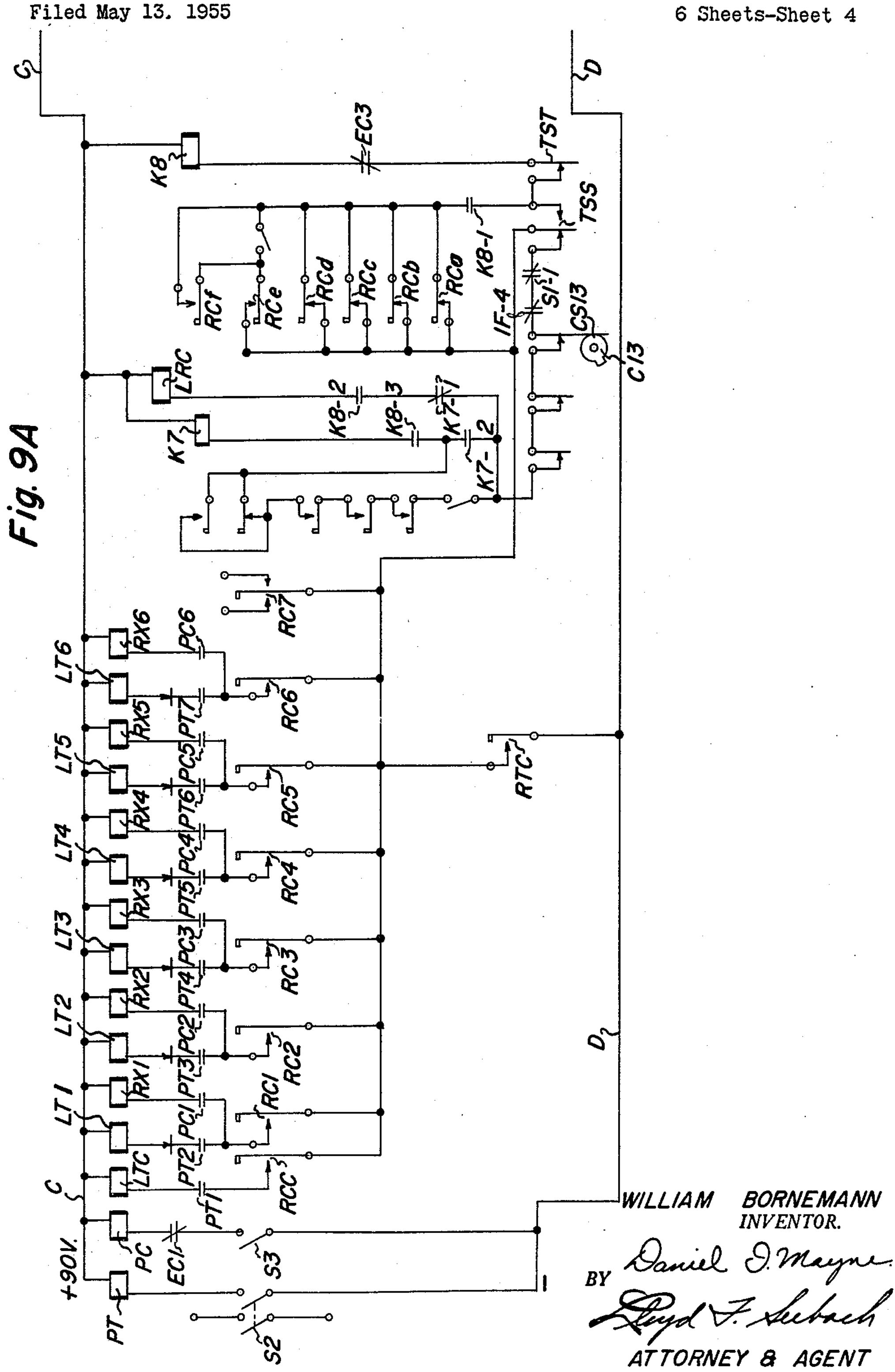
Figs. 9A, 9B and 9C are wiring diagrams which disclose the sensing means for the indicia on the tape and the connections to the actuating means of the device embodying the invention and the recording device.

The sensing means for tape 28 is disclosed in the above-mentioned U.S. Patent No. 2,700,446 and comprises a plurality or normally open contacts RC1–7 and RCC, see Fig. 9A, which actuate to a closed position whenever an aperture 81 is sensed. Contact RCC is operative in each reading cycle and contact RC7 constitutes a tape run-out contact. Switch S2 and S3 control the programming for the tape typewriter and the camera. In other words, closing of switch S2 completes the circuit from the positive side to the negative side through relay PT. Energization of relay PT closes its associated PT1–7 contacts and upon closing of any one or combination of RCC and RC1–6 contacts, relays LTC and LT1–6 will be energized to actuate the respective contacts in the tape typewriter for typing the characters corresponding to the code on the tape, contact RTC being closed with the positioning of tape 28 in the tape reader or senser. Closing of switch S3 completes the circuit from the positive to the negative side through relay PC which then closes its associated PC contacts to complete circuits through one of any combination of contacts RC1–6, thereby energizing relays RX1–6 in series with the PC contacts. Relays RX1–6 close their associated contacts in the stepping switch SS which, in turn, also controls the solenoids 62 in device 20. By closing both switches S2 and S3, the tape typewriter and device 20 for recording the code can be operated simultaneously from the same tape.

As previously mentioned and as more fully described in the above patents, tape switch RTC to the negative side is closed when the tape is properly positioned in the tape reader. In addition, tape start switch TSS must be actuated momentarily to its lower position to start movement of the tape through the reader. Relay K8 is then energized through switches TST, TSS and RTC and its contact K81 is closed, thereby holding in relay K8 through any one of contacts RC*a–d* from the positive to the negative side through switch RTC. At the same time, contact K82 is closed to energize the reader clutch relay LRC from the positive side through K8–2—K–8—7, and the switches in series with the tape start switch TSS, which is now in its original position, to the negative side through switch RTC. With the exception of switch CS13 and contacts SI1 and IF4, the other switches and contacts disclosed in the reader control portion of the circuit control the operation of the tape reader and form no part of the present invention.

Figure 9B:
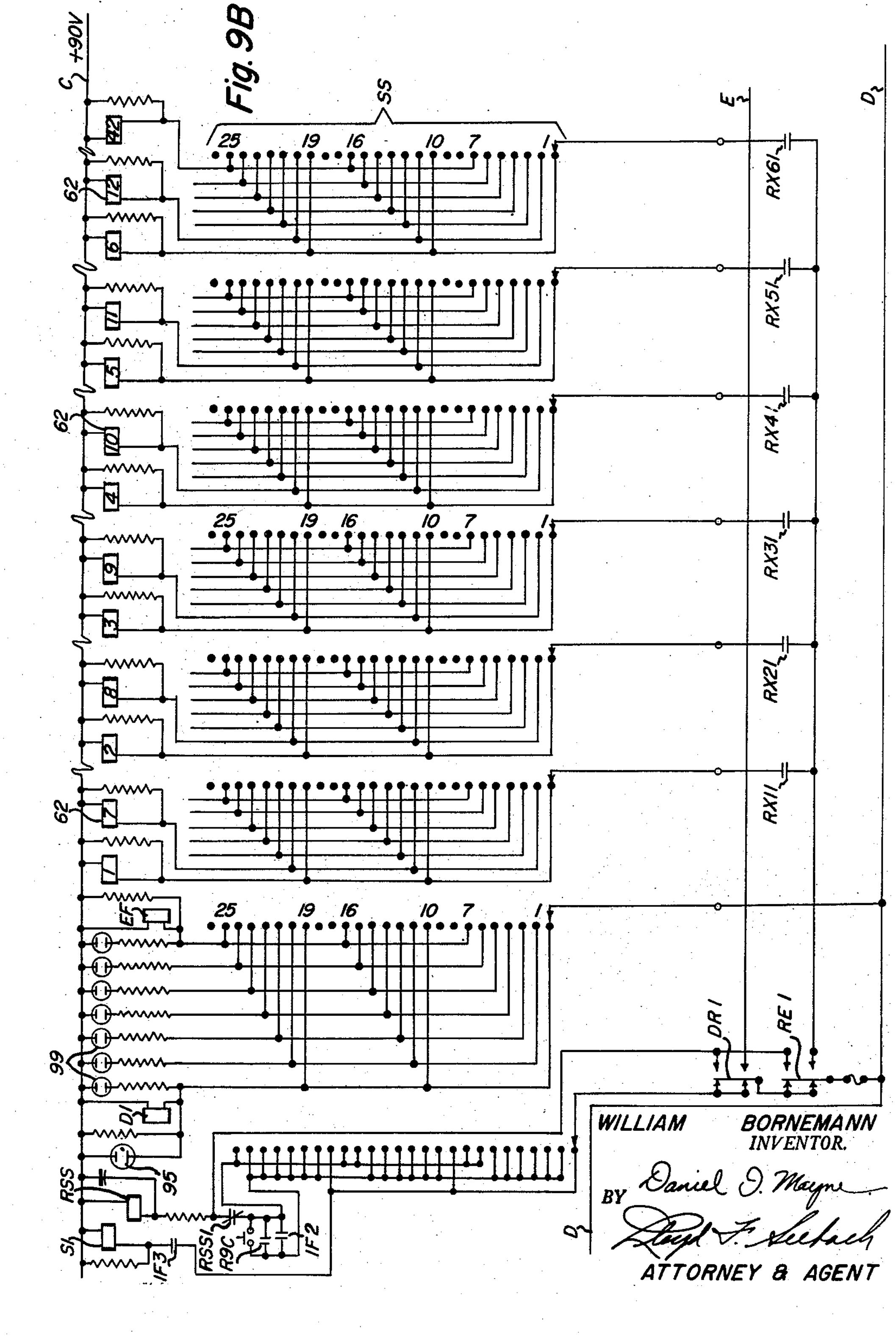
Figure 9C:
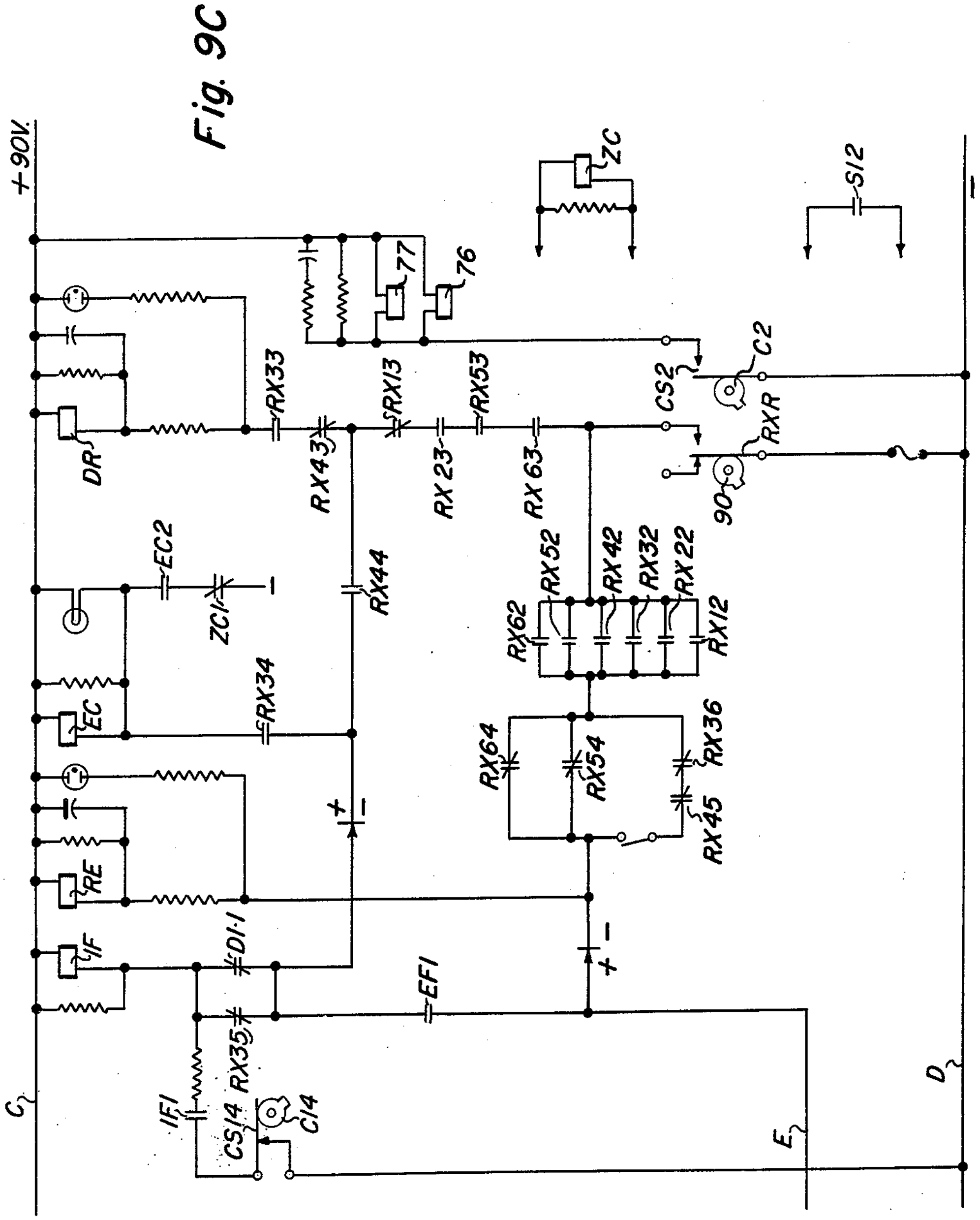

Stepping switch SS, see Fig. 9B, which actuates on release, comprises eight banks of contacts, each bank having twenty-six contacts. The six latter banks are associated with the actuation of solenoids 62 in device 20. When any one or a combination of apertures are sensed in tape 28, the corresponding relays RX1–6 are energized, thereby closing their respective contacts. For example, assume stepping switch SS is in the first position and positions 1, 3 and 4 on tape 28 are punched and that this particular line is being read. Relays RX1, RX3 and RX4 are then energized and contacts RX11 and RX12 are closed and RX13 is opened; contacts RX31, RX32, RX33 and RX34 are closed and RX35 and RX36 are opened; and contacts RX41 and RX42 are closed and RX43, RX44 and RX45 are opened, also see Fig. 9C. The closing of RX11, RX31 and RX41 connects the corresponding solenoids 62 across the line from the positive to the negative side and links 67 are moved thereby to release latch members 43 and permit arms 40 to be moved by springs 51 to a position in which the corresponding pins 39 no longer obstruct aperture 32. At the same time, relay RE is connected from the positive to the negative side by contacts RX54 or RX64, RX12, RX32 and RX42 and switch RXR which is actuated to closed position momentarily by cam 90 in the tape typewriter and RE1 is moved to its other position. In this position of RE1 stepping switch relay RSS is connected from plus to minus by contact RE1 and only upon release is stepping switch SS then moved to the second position. Cam 90 closes switch RXT in synchronism with the reading of each line of code. From the connections of the RX contacts in the circuit with relay RE, it can be seen that relay RE is energized by the closing of any one or combinations of the contacts associated with relays RX1–6 and then is released which causes stepping switch SS to move to its next position.

Each of the successive lines of code are read in the same manner and for each line the corresponding relays RX1–6 are energized together with the relays RE and RSS. When the seventh line of code is in position for being sensed, stepping switch SS is in the seventh position. In this position relay EF associated with the second bank of stepping switch SS is energized and its contact EF1 is closed, see Fig. 9C, and potential is applied to relay IF through DI1 and/or RX35 and EF1 up to the combination of RX contacts. With the closing and/or opening of the RX relay contacts corresponding to the code positions sensed, relay RE is energized and at the same time the circuit is completed through the same path to energize relay IF which is then held in by its contact IF1 now in the closed position and connected from plus to minus through switch CS14 actuated by cam C14 in the camera. At the same time, contacts IF2 and IF3 are closed and IF4 is opened. At this time seven lines of code are presented in device 20 for exposure on the film and IF4, see Fig. 9A, breaks the reader clutch circuit to prevent sensing of the next line of code until the exposure of the code presented by device 20 has been made. Stepping switch SS is released when relay RE is de-energized and moves to its next or eighth position. Exposure of the film now takes place and after the exposure an unexposed area of film is moved into exposure station 18. During advancement of the film, cam C14 opens CS14 to cut out relay IF.

Upon completion of the exposure and film advance, cam C2 actuates switch CS2 momentarily to a closed position in which the circuit is completed for energizing solenoids 76 and 77 which actuate plate 73 to simultaneously reset all of the arms 40 and pins 39 in the unobstructing position with respect to aperture 32. In the eighth and ninth positions of stepping switch SS, its relay RSS is energized through contacts RE1 and DR1 in the positions shown. Energization of relay RSS opens its contact RSS1 in series therewith in both the eighth and ninth position and which finally positions it in the tenth position which is a "home"or zero position, as well as positions one and nineteen. The same actuation follows with respect to the seventeenth and eighteenth positions and also with respect to the twenty-sixth position.

At the time stepping switch SS is in the tenth position, relay SI is energized which opens its contacts SI1 in series with IF4 to render the tape reader inoperative and closes its contact SI2 across the camera operating switch and automatically releases cams C13 and C14. Cam C14 opens switch CS14 and relay IF is de-energized, thereby opening its holding contact IF1, opening IF2, opening IF3 to de-energize relay SI and closing IF4, the closing of IF4 and de-energization of solenoid SI which closes its contact SI1 and open SI2 conditions the reader circuit and camera for the next line of code to be presented by device 20. Cam C13 then closes contact CS13 to again render the tape reader operative for presenting the next line of code. Contact SI2 which is in the camera eliminates any necessity for manual operation. Cam C13, which is also in the camera, opens switch CS13 prior to energization of solenoid SI and closes it subsequent to de-energization to insure that the tape reader does not start before the camera is conditioned for acceptance when stepping switch SS is actuated to each "home" position, the operation and sequence of actuation is repeated for each group of seven lines of code on the tape 28. It will be noted that the contacts in the second bank of stepping switch SS which correspond to the same code position are connected to neon lamps 94 for indicating to the operator the line of code being recorded. Each "home" position is also connected to an indicator lamp 95.

At the end of the lines of code on the tape 28, a special line of code is punched for controlling the operation of recording. If it is assumed that fifty-eight characters had been punched in successive lines on the tape, then device 20 would present eight full lines of code for recording and only two lines would appear for recording in the next presentation. If it is also assumed that the first line of code on the tape was presented with the stepping switch SS in its first position, then the fifty-eighth line would be recorded when switch SS is in its eleventh position. The next line on the tape containing the special code punched in the second, third, fourth, fifth and sixth positions causes energization of relays RX2, RX3, RX4, RX5 and RX6. Relays RX3, RX4, RX5 and RX6 open contacts RX36, RX45, RX54 and RX64 thereby preventing energization of relay RE and any actuation of solenoids 62 in device 20. Contacts RX23, RX33, RX53 and RX63 are, however, closed and contact RX43 is opened, therefore, preventing energization of relay DR throuhg switch RXR which is actuated to a closed position by cam 90 as described hereinbefore, contact DR1 then being moved to its other position. At the same time, however, relay IF is energized through contact DI1, RX44 which is now closed and switch RXR, RX35 having been opened, and relay EC is energized with the closing of contact RX34. Relay IF, as described herebefore, is held in by its contact IF1. Relay EC opens its contact EC1, see Fig. 9A, to cut out any actuation of the tape reader, and closes its contact EC2 which holds relay EC across the lines. When cam 90 permits opening of switch RXR, relay IF is deenergized and stepping switch SS advances to the twelfth position. In this position IF2 completes the circuit through RE1 and DR1 to energize relay RSS, thereby moving it to the next position and continues to reenergize relay RSS until it is in the seventeenth and eighteenth position. In the next "home" position, that is the nineteenth position, relay SI is energized as before. If a new area of film is to be moved into position after the exposure of the partial line of code in device 20, a solenoid in the camera is energized after the area is properly positioned in the exposure station. Relay ZC is connected across this solenoid and when the solenoid is energized, relay ZC is also energized and opens its contact ZC1 which releases relay EC. Since relays IF and SI are deenergized when stepping switch SS is in one of its "home" positions by switch CS14, the closing of switch CS13 by cam C13 again conditions the tape reader.

In the event, the number of lines of code on tape 28 is divisible by seven so that the last line is read with stepping switch SS in the seventh, sixteenth or twenty-fifth position, then the "end of code" line on the tape, which is punched in the second through sixth positions, energizes relay EC as just described. Relay DI, however, which is energized in these positions prevents energization of relay IF. This is accomplished by relay DI being energized in any one of the foregoing positions whereby its contact DI1 is opened and by the code in the third position on the tape which causes RX35 to also open. With both of contacts RX35 and DI1 open, relay IF cannot be energized. The reason for this control is to prevent waste of film as is evident when considered with respect to the camera described in my copending application. In the event relay IF should fail, contact R9C, which is closed by a relay in the camera, is actuated to the closed position with each positioning of the film carriage means into its "zero" position to insure that stepping switch SS is in one of its "home" or "zero" positions.

In order to provide a blank character indication or a space between any two lines of code on the tape or to indicate a division of code on the same element, a line of code is punched in the tape in the second, third, fifth and sixth positions. These positions in the tape result in energization of relays RX2, RX3, RX4 and RX5. Contacts RX36, RX54 and RX64 are then opened, thereby preventing energization of solenoids 62. Contact RX34 is closed, but contact RX44 remains open so relay EC cannot be energized. However, contacts RX23, RX33, RX53 and RX63 are closed to energize relay DR through switch 90 by cam RX4. Relay DR closes its contact DR1 to energize stepping switch relay RSS through RE1. Upon opening of switch 90, relay DR is then deenergized and stepping switch SS then actuates to the next position. The complete line in aperture 32 then appears with the six pins representative of the blank space in their obstructing position.

From the description of the tape reader and actuating means for the device 20, it is evident that arms 40 and pins 39 are arranged to operate in groups, that the arms to be actuated in each group are released simultaneously, and that the groups are actuated successively. It should also be evident that device 20 can be expanded or contracted to accommodate a particular application. While in the described embodiment various sequences of operation are accomplished automatically or in conjunction with the camera, such an operation as resetting of arms 40 can be accomplished by manual operation or by a manually operated switch. Also, although the device 20 is described in conjunction with a camera, it may be utilized or adapted for use with many other types of apparatus.

While a specific form of the invention has been described with respect to a particular apparatus for purpose of illustration, it is to be understood that many modifications thereof may be contemplated by those skilled in the art without departing from the spirit of the invention.

Having now particularly described my invention, what I desire to secure by Letters Patent of the United States and what I claim is:

1. In a device for presenting a pattern of light identical to each line of indicia representative of a character and arranged in successive lines on an information bearing medium, the combination comprising a plate provided with an elongated aperture, means arranged on one side of said plate for illuminating said aperture, a plurality of single shutter members arranged side by side with respect to said plate and said aperture and in a position for preventing transmission of light through said aperture, each of said shutter members corresponding to one of the indicia positions on said information bearing medium, means operatively connected to each of said shutter members for moving its respective shutter member into a position in which the portion of said aperture normally obstructed thereby is free to transmit light, latching means arranged with respect to and engaging each of said shutter members for normally maintaining said shutter members in the light-obstructing position, releasing means operatively connected to each of said latching means for disengaging said latching means from said shutter members to permit movement of said shutter members to the unobstructing position, and means responsive to the indicia of each line on said information bearing medium, as said medium is moved with respect thereto, for simultaneously actuating the releasing means of said shutter members corresponding to the indicia positions of the sensed line of indicia.

2. In a device for presenting a pattern of light identical to each line of indicia representative of a character and arranged in successive lines on an information bearing medium, the combination comprising a plate provided with an elongated aperture, means arranged on one side of said plate for illuminating said aperture, a plurality of single shutter members arranged side by side with respect to said plate for preventing transmission of light through said aperture, each of said shutter members corresponding to one of the indicia positions on said information bearing medium, means operatively connected to each of said shutter members for moving its respective shutter member into a position in which the portion of said aperture normally obstructed thereby is free to transmit light, latching means arranged with respect to and engaging each of said shutter members for normally maintaining said shutter members in the light-obstructing position, releasing means operatively connected to each of said latching means for releasing said shutter members to permit movement thereof to the unobstructing position, means responsive to the indicia of each line on said information bearing medium, as said medium is moved with respect thereto, for simultaneously actuating the releasing means of said shutter members corresponding to the indicia positions of the sensed line of indicia, and means arranged to engage said shutter members in their unobstructing position for simultaneously resetting the released shutter members with respect to said aperture prior to sensing the succeeding line of indicia.

3. In a device for presenting a pattern of light corresponding to each line of indicia representative of a character and arranged in successive lines on an information bearing medium, the combination comprising a plate provided with an elongated aperture, means arranged on one side of said plate for illuminating said aperture, a plurality of members pivotally mounted on each side of said plate and having extending portions adjacent said plate and arranged in side by side relation on the same side thereof for preventing transmission of light through said aperture, each of said members being associated with one of the indicia positions on said information bearing means, resilient means operatively engaging each of said members for moving said members into a position in which the respective extending portions permit transmission of light through the portion of the aperture normally obstructed thereby, latching members pivotally mounted with respect to said members for engaging the end thereof to maintain said extending portions in the light-obstructing position, actuating means including a solenoid and an operating link operatively connected to each of said latching members for releasing said members to permit movement thereof to the non-obstructing position, means for sensing each line of indicia on said information bearing medium, and electrical means responsive to said sensing means for rendering said actuating means operative to simultaneously release the members corresponding to the indicia positions in the sensed line of indicia.

4. In a device for presenting a pattern of light corresponding to each line of indicia representative of a character and arranged in successive lines on an information bearing medium, the combination comprising a plate provided with an elongated aperture, means arranged on one side of said plate for illuminating said aperture, a plurality of members pivotally mounted on each side of said plate and having extending portions adjacent said plate and arranged in side by side relation on the same side thereof for preventing transmission of light through said aperture, each of said members being associated with one of the indicia positions on said information bearing medium, resilient means operatively engaging each of said members for moving said members into a position in which the respective extending portions permit transmission of light through the portion of the aperture normally obstructed thereby, latching members pivotally mounted with respect to said members for engaging the end thereof to maintain said extending portions in the light-obstructing position, means arranged with respect to said members for engaging and maintaining said members in the non-obstructing position, actuating means including a solenoid and an operating link operatively connected to each of said latching members for releasing said members to permit movement thereof to the non-obstructing position, means for sensing each line of indicia on said information bearing medium, and electrical means responsive to said sensing means for rendering said actuating means operative to simultaneously release the members corresponding to the indicia positions in the sensed line of indicia, and means operatively connected to said engaging means and rendered operative prior to sensing the succeeding line of indicia for moving said engaging means in a direction to simultaneously reset the released members with respect to said aperture and said latching members.

5. In a device for successively presenting a predetermined number of patterns of light arranged in a line, each pattern being identical to a line of indicia representative of a character and arranged in successive lines on an information bearing medium, the combination comprising a plate provided with an elongated aperture, means arranged on one side of said plate for illuminating said aperture, a plurality of single shutter members arranged side by side with respect to said plate and said aperture and in a position for preventing transmission of light through said aperture, said members comprising a number of groups in accordance with said predetermined number of patterns and the number of members in each group corresponding to the number of indicia positions in each line, means operatively connected to each of said shutter members for moving its respective member into a position in which the portion of said aperture obstructed thereby is free to transmit light, latching means arranged with respect to and engaging each of said shutter members for normally maintaining said members in the light-obstructing position, actuating means operatively connected to each of said latching means for releasing said shutter members to permit movement thereof to the unobstructing position, means arranged with respect to said medium for sensing the successive lines of indicia on said information bearing medium, as said medium is moved with respect thereto, and means responsive to said sensing means for simultaneously releasing in each group said latching means of said members corresponding to the indicia in each line and for successively rendering operative said actuating means of each of said groups, whereby the patterns are presented in the same order as the lines of indicia are sensed.

6. In a device for successively presenting a predetermined number of patterns of light arranged in a line, each pattern identical to a line of indicia representative of a character and arranged in successive lines on an information bearing medium, the combination comprising a plate provided with an elongated aperture, means arranged on one side of said plate for illuminating said aperture, a plurality of single shutter members arranged side by side with respect to said plate and said aperture and in a position for preventing transmission of light through said aperture, said members comprising a number of groups in accordance with said predetermined number of patterns and the number of members in each group corresponding to the number of indicia positions in each line, means operatively connected to each of said shutter members for moving its respective member into a position in which the portion of said aperture obstructed thereby is free to transmit light, latching means arranged with respect to and engaging each of said shutter members for normally maintaining said members in the light-obstructing position, actuating means operatively connected to each of said latching means for releasing said shutter members to permit movement thereof to the unobstructing position, means arranged with respect to said medium for sensing the successive lines of indicia on said information bearing medium, as said medium is moved with respect thereto, means responsive to said sensing means for simultaneously releasing in each group said latching means of said members corresponding to the indicia in each line and for successively rendering operative said actuating means of each of said groups, whereby the patterns are presented in the same order as the lines of indicia are sensed, and means arranged to engage said shutter members in their unobstructing position for simultaneously resetting the released suhtter members in each group with respect to said aperture after presentation of the last of said predetermined number of patterns.

7. In a device for successively presenting a predetermined number of patterns of light in a line, each pattern corresponding to a line of indicia representative of a character and arranged in successive lines on an information bearing medium, the combination comprising a plate provided with an elongated aperture, means arranged on one side of said plate for illuminating said aperture, a plurality of members pivotally mounted on each side of said plate and having extending portions adjacent said plate and arranged in side by side relation on the same side thereof for preventing transmission of light through said aperture, said members comprising a number of groups in accordance with said predetermined number of patterns, the number of member in each of said groups corresponding to the number of indicia positions in a line of indicia, and each member in a group being associated with one of the indicia positions, resilient means operatively engaging each of said members for moving said members into a position in which the respective extending portions permit transmission of light through the portion of the aperture obstructed thereby, latching members pivotally mounted with respect to said members for engaging the end thereof to maintain said extending portions in the light-obstructing position, actuating means including a solenoid and an operating link operatively connected to each of said latching members for releasing said members to permit movement thereof to the non-obstructing position, means for sensing the successive lines of indicia on said information bearing medium, and electrical means responsive to said sensing means for rendering said actuating means operative to release the members corresponding to the indicia positions in each line, the solenoids in each group being actuated simultaneously and the group of solenoids for each line of indicia being actuated successively to present the patterns in the same order as the lines of indicia are scanned.

8. In a device for successively presenting a predetermined number of patterns of light in a continuous line, each pattern corresponding to a line of indicia representative of a character and arranged in successive lines on an information bearing medium, the combination comprising a plate provided with an elongated aperture, means arranged on one side of said plate for illuminating said aperture, a plurality of members pivotally mounted on each side of said plate and having extending portions adjacent said plate and arranged in side by side relation on the same side thereof for preventing transmission of light through said aperture, said members comprising a number of groups in accordance with said predetermined number of patterns, the number of members in each of said groups corresponding to the number of indicia positions in a line of indicia, and each member in a group being associated with one of the indicia positions, resilient means operatively engaging each of said members for moving said members into a position in which the respective extending portions permit transmission of light through the portion of the aperture obstructed thereby, latching members pivotally mounted with respect to said members for engaging the end thereof to maintain said extending portions in the light-obstructing position, means arranged with respect to said members for engaging and maintaining said members in the non-obstructing position, actuating means including a solenoid and an operating link operatively connected to each of said latching members for releasing said members to permit movement thereof to the non-obstructing position, means for sensing the successive lines of indicia on said information bearing medium, electrical means responsive to said sensing means for rendering said actuating means operative to release the members corresponding to the indicia positions in each line, the solenoids in each group being actuated simultaneously and the groups of solenoids for each line of indicia being actuated successively to present the patterns in the same order as the lines of indicia are scanned, and means operatively connected to said engaging means and operable upon energization of the last group of said solenoids for moving said engaging means in a direction to simultaneously reset the members in each group in the non-obstructing position with respect to said aperture and said latching means.

9. In apparatus for photographically recording on a light-sensitive material a pattern of light identical to a line of indicia representative of a character and arranged in successive lines on an information bearing medium, the combination comprising an exposure station for said light-sensitive material, a photographing station arranged in spaced relation to said exposure station and including a plate having an elongated aperture, means on one side of said plate for illuminating said aperture, optical means arranged between the other side of said plate and said exposure station for imaging said aperture on said light-sensitive material, a plurality of single shutter means arranged in side by side relation adjacent said aperture for preventing transmission of light therethrough, each of said shutter means being individual to an indicia position, actuating means operatively connected to each of said shutter means for moving said shutter means to a position in which the portion of said aperture normally obstructed thereby is free to transmit light, means for sensing the successive lines of indicia on said information bearing medium, means responsive to said sensing means for rendering said actuating means associated with the shutter means corresponding to the sensed indicia positions in each line operative simultaneously to present a pattern of light in said aperture for recording on said light-sensitive material, and means for simultaneously resetting all of the shutter means in the non-obstructing position with respect to said aperture upon completion of the exposure of the pattern of each line of indicia.

10. In apparatus for photographically recording on a light-sensitive material in a single line a pattern of light identical to a predetermined number of successive lines of indicia arranged on an information bearing medium, each line of indicia being representative of a character, the combination comprising an exposure station for said light-sensitive material, a photographing station arranged in spaced relation to said exposure station and including a plate having an elongated aperture, means on one side of said plate for illuminating said aperture, optical means arranged between the other side of said plate and said exposure station for imaging said aperture on said light-sensitive material, a plurality of single shutter means arranged in side by side relation adjacent said aperture for preventing transmission of light therethrough, said shutter means comprising a number of groups in accordance with said predetermined number of lines of indicia, the number of said shutter means in a group corresponding to the number of indicia positions, and each shutter means in a group being individual to an indicia position, actuating means operatively connected to each of said shutter means for moving said shutter means to a position in which the portion of said aperture normally obstructed thereby is free to transmit light, means for sensing the successive lines of indicia on said information bearing medium, means responsive to said sensing means for rendering the actuating means in each group operative simultaneously and for rendering each group of actuating means operative successively to present the patterns in the same order as said lines are scanned for exposure on said light-sensitive material, and means for simultaneously resetting the shutter means of all groups in the non-obstructing position with respect to said aperture upon completion of the exposure of each complete pattern.

11. In apparatus for photographically recording on a light-sensitive material in a single continuous line, a pattern of light corresponding to a predetermined number of successive lines of indicia arranged on an information bearing medium, each line of indicia being representative of a character, the combination comprising an exposure station for said light-sensitive material, a photographing station arranged in spaced relation to said exposure station and including a plate having an elongate aperture, means on one side of said plate for illuminating said aperture, optical means arranged between the other side of said plate and said exposure station for imaging said aperture on said light-sensitive material, shutter means associated with said exposure station for normally preventing exposure of said light-sensitive material, a plurality of shutter means arranged in side by side relation adjacent said aperture for preventing transmission of light therethrough, said shutter means comprising a number of groups in accordance with said predetermined number of lines of indicia, the number of said shutter means in a group corresponding to the number of indicia positions, and each shutter means in a group being individual to an indicia position, actuating means operatively connected to each of said shutter means for moving said shutter means to a position in which the portion of said aperture normally obstructed thereby is free to transmit light, means for sensing the successive lines of indicia on said information bearing medium, means responsive to said sensing means for rendering the actuating means in each group operative simultaneously and for rendering each group of actuating means operative successively to present the patterns in the same order as said lines are scanned, and means for actuating the shutter means associated with said exposure station after the last group of said actuating means have been rendered operative to record the complete pattern of light on said light-sensitive material.

12. In apparatus for photographically recording on a light-sensitive material in a single continuous line, a pattern of light corresponding to a predetermined number of successive lines of indicia arranged on an information bearing medium, each line of indicia arranged on an information bearing medium, each line of indicia being representative of a character, the combination comprising an exposure station for said light-sensitive material, a photographing station arranged in spaced relation to said exposure station and including a plate having an elongated aperture, means on one side of said plate for illuminating said aperture, optical means arranged between the other side of said plate and said exposure station for imaging said aperture on said light-sensitive material, shutter means associated with said exposure station for normally preventing exposure of said light-sensitive material, a plurality of shutter means arranged in side by side relation adjacent said aperture for preventing transmission of light therethrough, said shutter means comprising a number of groups in accordance with said predetermined number of lines of indicia, the number of said shutter means in a group corresponding to the number of said shutter means in a group corresponding to the number of indicia positions, and each shutter means in a group being individual to an indicia position, actuating means operatively connected to each of said shutter means for moving said shutter means to a position in which the portion of said aperture normally obstructed thereby is free to transmit light, means for sensing the successive lines of indicia on said information bearing medium, means responsive to said sensing means for rendering the actuating means in each group operative simultaneously and for rendering each group of actuating means operative successively to present the patterns in the same order as said lines are scanned, means for actuating the shutter means associated with said exposure station after the last group of said actuating means have been rendered operative to record the complete pattern of light on said light-sensitive material, and means for simultaneously resetting the shutter means of all groups in the non-obstructing position with respect to said aperture upon completion of the exposure of said light-sensitive material.

References Cited in the file of this patent

UNITED STATES PATENTS

| | | |
|---|---|---|
| 2,392,224 | Bryce | Jan. 1, 1946 |
| 2,641,976 | Bryce | June 16, 1953 |
| 2,663,232 | Drillick | Dec. 22, 1953 |
| 2,697,649 | Roth | Dec. 21, 1954 |